Sept. 24, 1968     F. T. SPELLMAN, JR     3,402,805
VEHICLE MOUNTED CONVEYOR
Filed June 8, 1966     6 Sheets-Sheet 1
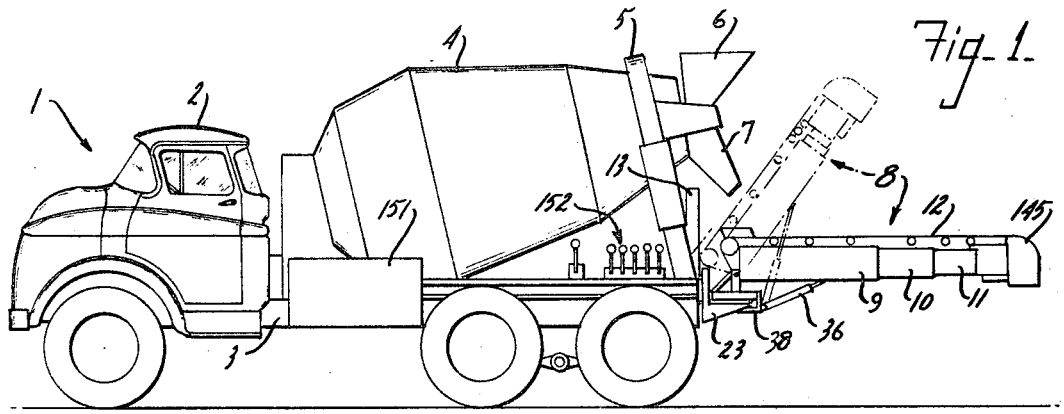
Fig. 1.
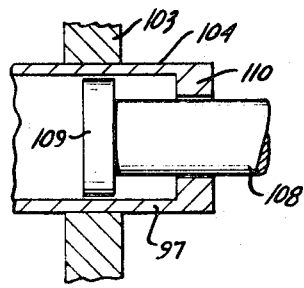
Fig. 10.
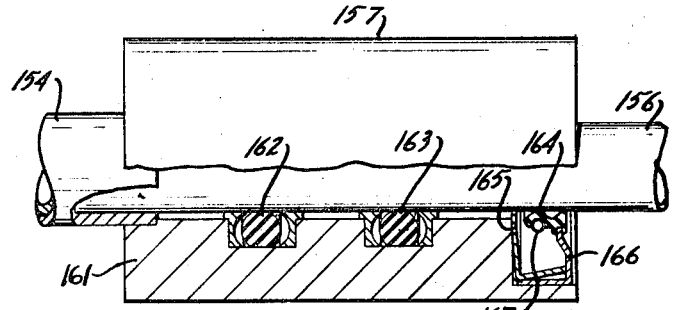
Fig. 11.
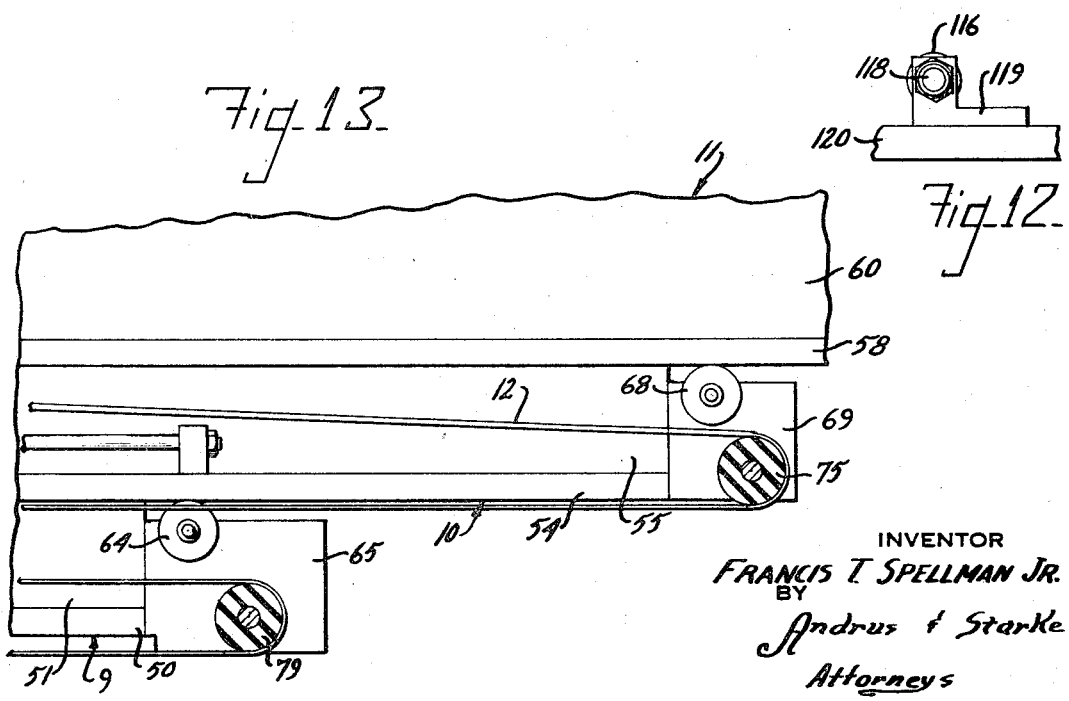
Fig. 13.
Fig. 12.
INVENTOR
FRANCIS T. SPELLMAN JR.
BY
Andrus & Starke
Attorneys

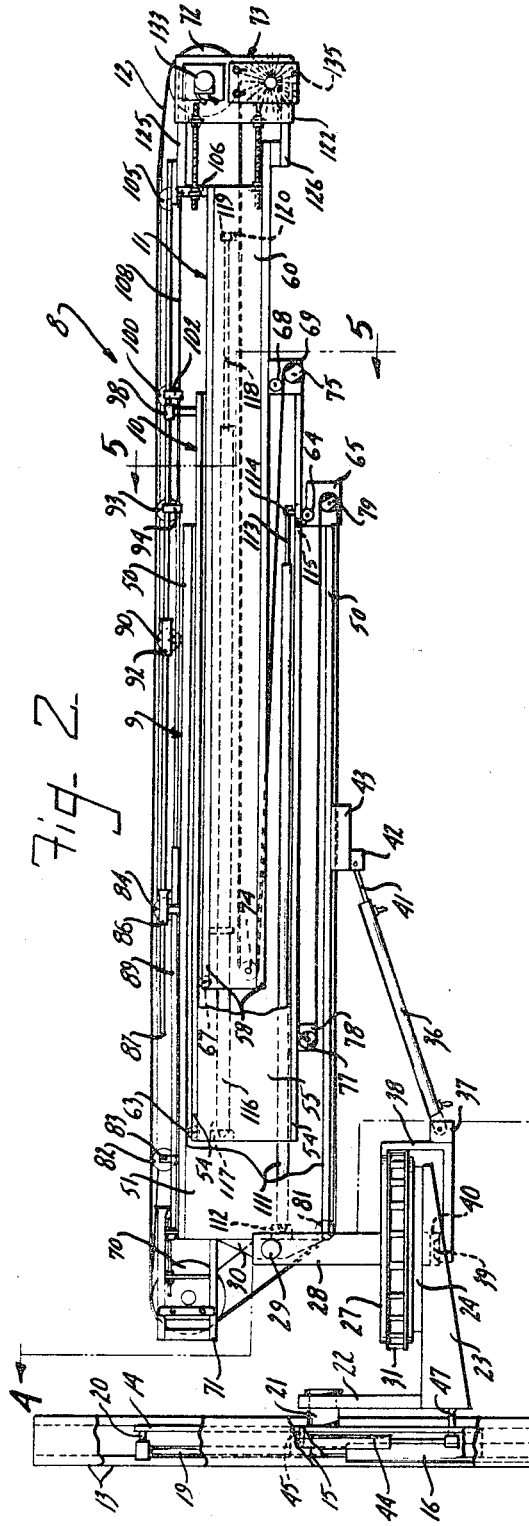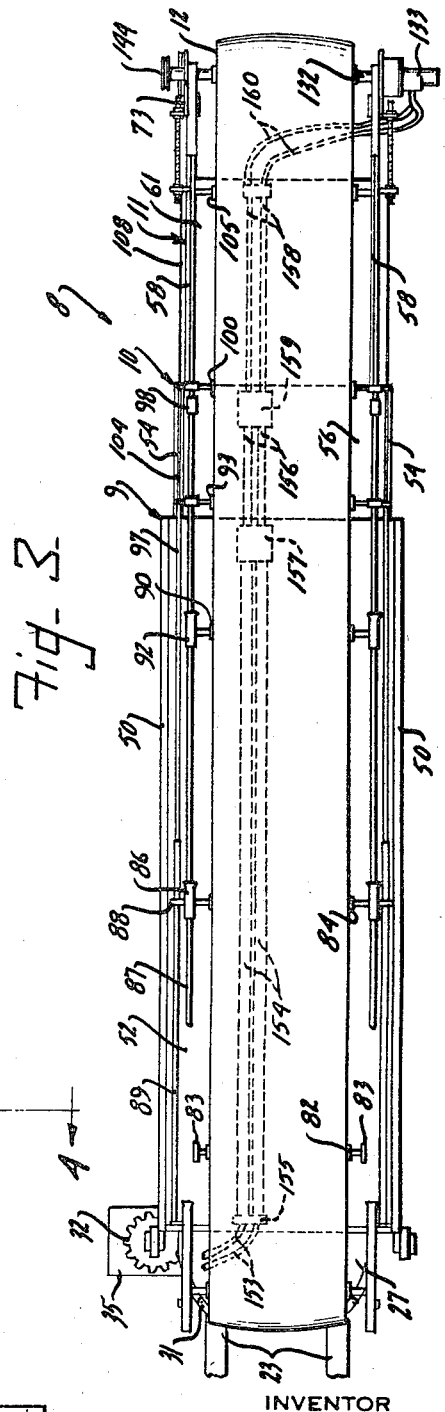

Sept. 24, 1968  F. T. SPELLMAN, JR  3,402,805
VEHICLE MOUNTED CONVEYOR
Filed June 8, 1966  6 Sheets-Sheet 3

INVENTOR
FRANCIS T. SPELLMAN JR.
BY
Andrus & Starke
Attorneys

Sept. 24, 1968  F. T. SPELLMAN, JR  3,402,805
VEHICLE MOUNTED CONVEYOR
Filed June 8, 1966  6 Sheets-Sheet 4

INVENTOR
FRANCIS T. SPELLMAN JR.
BY
Andrus & Starke
Attorneys

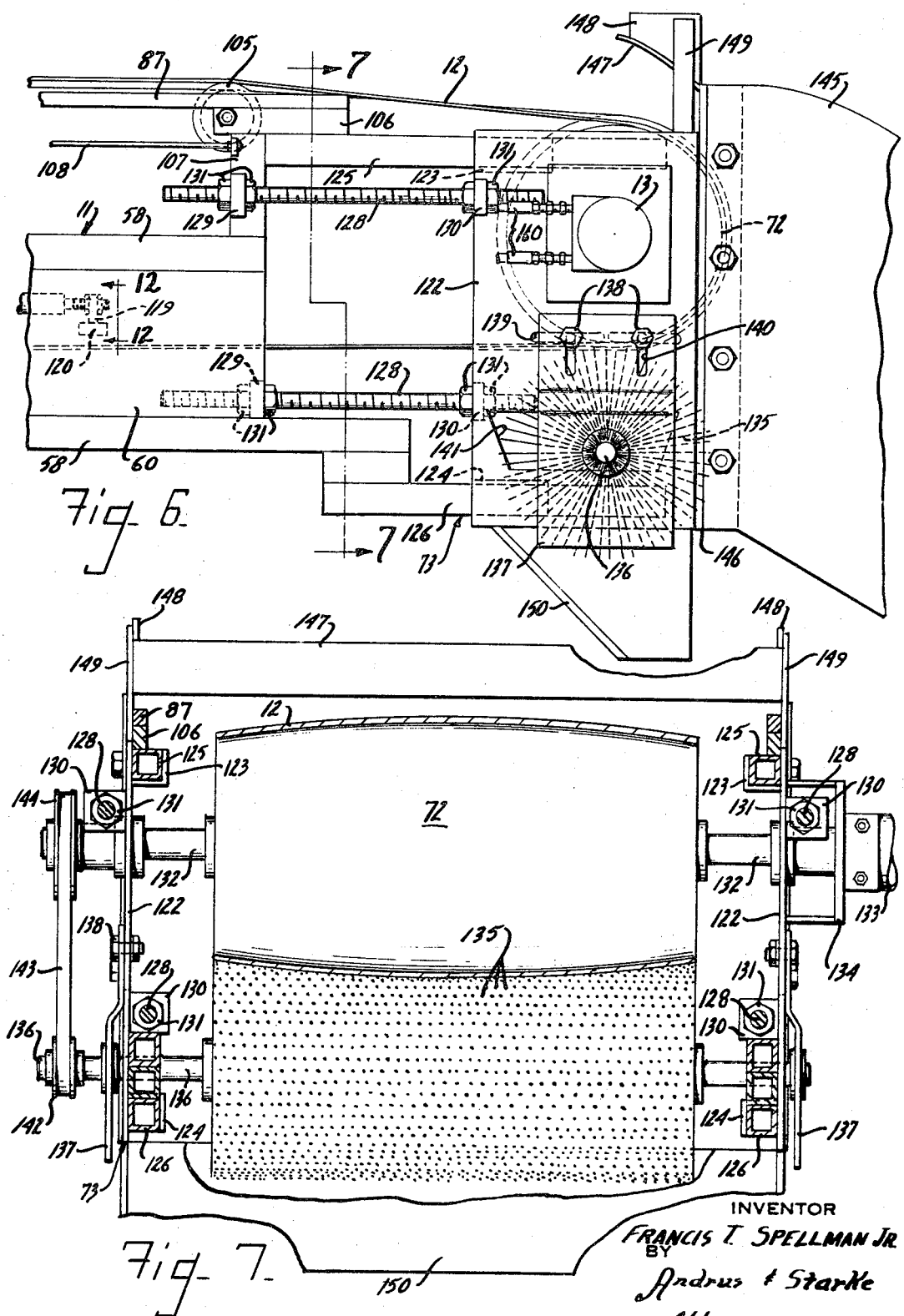

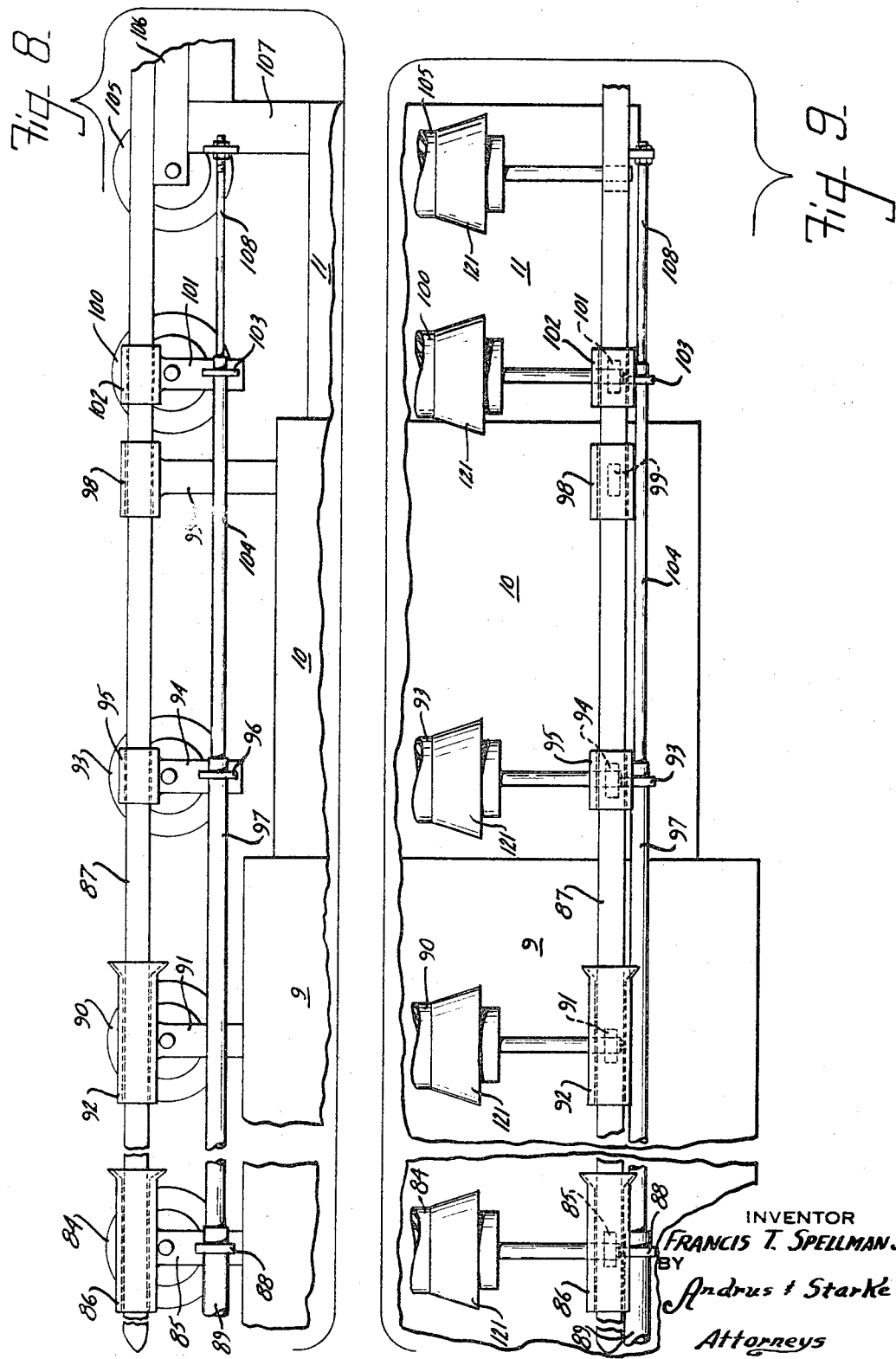

United States Patent Office 3,402,805
Patented Sept. 24, 1968

3,402,805
VEHICLE MOUNTED CONVEYOR
Francis T. Spellman, Jr., Verona, Wis., assignor to Spellman Hydraveyor, Inc., Madison, Wis., a corporation of Wisconsin
Filed June 8, 1966, Ser. No. 556,026
15 Claims. (Cl. 198—139)

ABSTRACT OF THE DISCLOSURE

The invention relates to an adjustable, vehicle-mounted conveyor including a series of telescopic conveyor sections with the innermost conveyor section being adjustably connected to the truck so that the conveyor is capable of pivoting both in a horizontal and vertical plane, as well as moving vertically and being pivotable around a horizontal axis.

The conveyor includes an endless belt carried by the telescopic conveyor sections and the belt telescopes with telescopic movement of the sections. The belt is supported on a series of rollers and a provision is made to move at least a portion of the rollers during telescopic movement of the conveyor sections so as to maintain approximate equidistant spacing between the rollers as the conveyor sections extend and retract.

The conveyor belt is driven by a hydraulic motor located at the outer end of the outermost conveyor section and the hydraulic lines which are connected to the motor extend within the conveyor sections and telescope with telescopic movement of the sections.

---

This invention relates to a conveyor and more particularly to an adjustable vehicle-mounted conveyor.

In a conventional ready-mix concrete truck, the concrete is continuously rotated in a drum mounted on the truck chassis. At the site of use the concrete is discharged from the drum onto a small chute which serves to guide the concrete to the pouring location. Normally the chute is pivoted to the drum so that it can be manually moved in horizontal and vertical directions to direct the concrete to the pouring location. In many cases the pouring is done in locations which are inaccessible to the ready-mix truck and therefore the concrete cannot be discharged directly to the pouring location. In such cases the concrete must be transported to the site manually by wheelbarrows, or by use of auxiliary conveyors or crane operated buckets.

Thus, the conventional ready-mix truck is greatly restricted in discharging the concrete for the discharge chute has only a minimum length and the concrete cannot be elevated with the conventional discharge chute. As a further disadvantage, the gravity feed of the concrete on the discharge chute results in segregation of the components of the concrete which is undesirable. Moreover, it is usually necessary to wet down the discharge chute prior to and during the time the concrete is moving along the chute by gravity, and this tends to increase the water content of the concrete, resulting in a longer hardening or setting period for the concrete.

The present invention is directed to an adjustable, vehicle-mounted conveyor which is particularly adapted for use with a ready-mix concrete truck. According to the invention, the conveyor comprises three telescopic conveyor sections and the innermost section is adjustably connected to the truck chassis so that the conveyor is capable of moving with four separate and distinct movements. The conveyor is mounted on vertical guides on the truck chassis so that the entire conveyor can be moved in a vertical plane. In addition, the conveyor is pivotally mounted for movement in a vertical plane so that it can be tilted through about 90° and convey concrete or other materials up to about a 40° incline. In addition to the vertical pivotal movement, the conveyor is pivotally connected to the truck chassis for movement in a horizontal plane, enabling the conveyor to rotate or pivot through approximately 180°. As a further adjustment, the conveyor can be tilted or pivoted around a horizontal axis so that the conveyor can be maintained level even though the truck itself may be listing due to uneven terrain.

The concrete is conveyed by an endless belt carried by the conveyor sections, and the belt is adapted to telescope with telescopic movement of the conveyor sections. The belt is supported on a series of rollers and provision is made to move at least a portion of the rollers during telescopic movement of the conveyor sections so as to maintain approximate equidistant spacing between the rollers as the conveyor sections extend and retract.

The conveyor belt is driven by a hydraulic motor located at the outer end of the outermost conveyor section, and the hydraulic lines which are connected to the motor extend within the conveyor sections and telescope with telescopic movement of the sections.

To clean the belt, a brush is mounted for rotating movement beneath the outer end of the conveyor belt and rotates in contact with the belt to clean the same as the belt moves in its return path of travel toward the truck.

The conveying mechanism of the invention is extremely versatile and is capable of conveying concrete or other material horizontally a distance of 20 to 25 feet from the truck and up to 17 feet in height at an incline of 40°. The conveyor will operate to convey materials in either a fully extended position, a partially extended position or in a retracted position. Moreover, the conveyor can be readily retracted and raised to a transporting position where it will not interfere with the normal movement of the vehicle or truck.

Through the operation of a leveling adjustment, the conveyor will remain level regardless of any tilt or list in the truck due to uneven ground conditions.

Even though the concrete can be moved for long distances and up substantial inclines with the conveyor of the invention, no segregation of the components of the concrete will occur because there is no relative movement between the components as it is moved along the conveyor. Moreover, the belt is cleaned by the brush after the concrete is discharged from the belt and this substantially improves the maintenance problem and eliminates the problem of stones or cement contacting the rollers and other driving elements.

Other objects and advantages will appear in the course of the following description.

The drawings illustrate the best mode presently contemplated of carrying out the invention.

In the drawings:

FIG. 1 is a side elevation of a conventional ready-mix concrete truck utilizing the conveyor of the invention;

FIG. 2 is a side elevation of the conveyor with parts broken away in section;

FIG. 3 is a plan view of the conveyor;

FIG. 6 is an enlarged side elevation of the outer end of the outermost section showing the drive roller for the conveyor and the brush;

FIG. 7 is a transverse section taken along line 7—7 of FIG. 6;

FIG. 8 is an enlarged fragmentary side elevation showing the supporting rollers for the conveyor;

FIG. 9 is a plan view of the structure shown in FIG. 8;

FIG. 10 is a sectional view with parts broken away showing the connection of the tubular members utilized to move the belt supporting rollers;

FIG. 11 is a plan view with parts broken away in section showing the sealing arrangement for the telescopic hydraulic lines for the conveyor motor;

FIG. 12 is a veiw taken along line 12—12 of FIG. 6 showing the connection of the piston rod of the hydraulic cylinder to the outermost conveyor section; and FIG. 13 is an enlarged side elevation of the outer ends of the inner and middle conveyor sections in the retracted position, with parts broken away in section.

Figure 4:
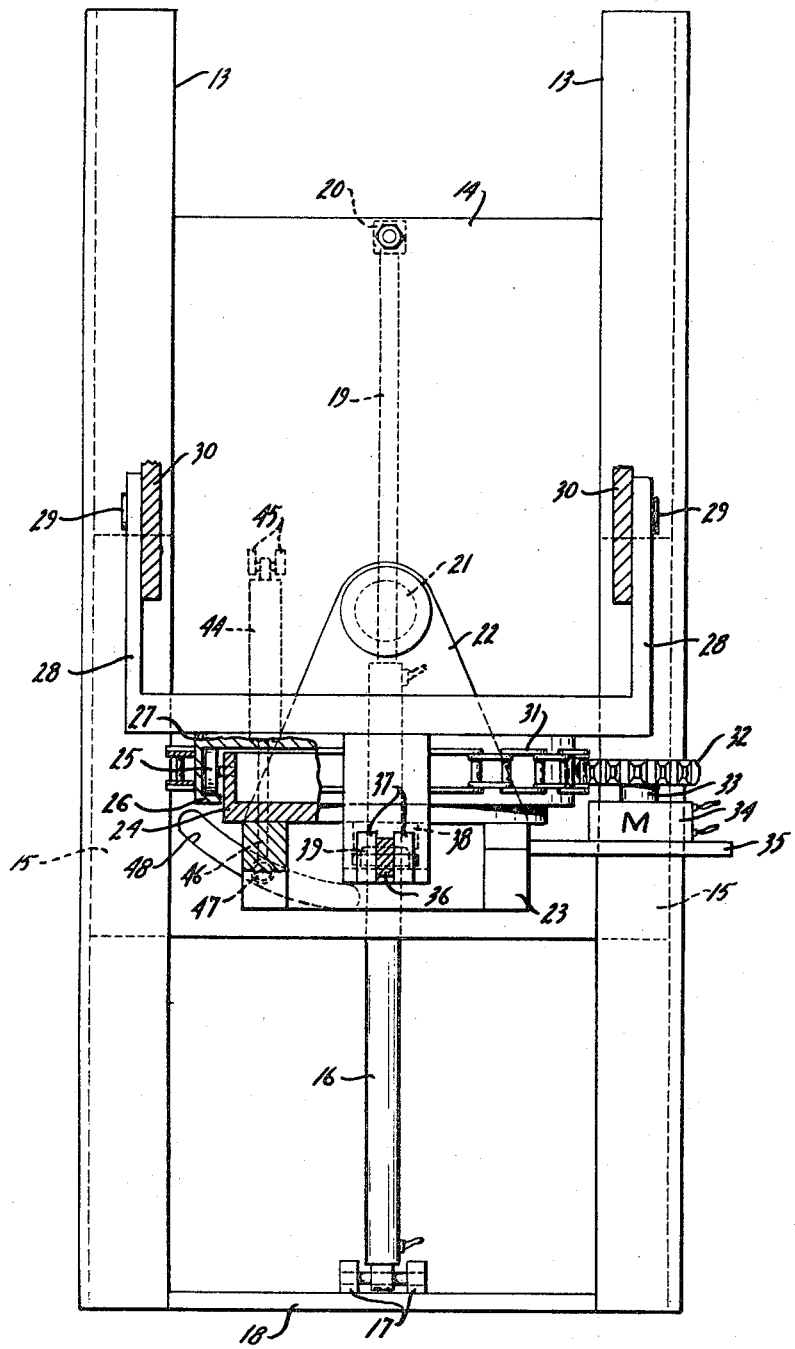
FIG. 4 is a section taken along line 4—4 of FIG. 2 and showing the manner in which the conveyor is adjustably supported from the truck chassis.

The drawing illustrates a conventional ready-mix concrete truck 1 including a cab 2 and a chassis 3. A drum 4 containing concrete is rotatably mounted on the chassis and the rear end of the drum can be raised and lowered through an adjustable support 5. Concrete is introduced into the drum through a hopper 6 and is discharged from the rotating drum at the pouring site through a chute 7.

According to the invention a conveyor 8 is mounted on the rear end of the truck chassis and serves to receive the concrete from the chute 7 and convey the concrete to the pouring location.

The conveyor 8 includes three telescopic sections, an inner section 9 connected to the truck chassis 3, a middle section 10 and an outer section 11. The concrete is adapted to be conveyed on an endless belt 12 which is carried by the three conveyor sections and is adapted to telescope along with telescopic movement of the conveyor sections.

The structure for mounting the conveyor 8 on the truck chassis is best shown in FIGS. 2 and 4. A pair of spaced, vertical channels 13 extend upwardly from the truck chassis, and a plate 14 is provided with a pair of guide members 15 along its side edges which are adapted to slide within the channels 13. The conveyor 8 is connected to the plate 14, as will be more fully described, and by moving plate 14 vertically within the channels 13 the vertical position of the conveyor can be altered.

The plate 14 is moved vertically with trespect to the guide channels 13 by a hydraulic unit, including a hydraulic cylinder 16 having its lower end pivotally connected to lugs 17 which are connected to cross bar 18 extending between the channels 13. Piston rod 19 which is slidably mounted within the cylinder 16 is connected to a bracket 20 attached to the back side of the plate 14. When hydraulic fluid is supplied to the lower end of cylinder 16, the piston rod 19 will extend and the plate 14 and the conveyor 8 will be moved upwardly. Conversely, when hydraulic fluid is introduced into the upper end of the cylinder 16, the piston rod 19 will be retracted and the plate 14 and conveyor 8 will be moved downwardly.

To mount the conveyor on the plate 14, a horizontal shaft 21 extends outwardly from the plate 14 and a vertical plate 22 is secured to the shaft and extends generally parallel to the plate 14. Connected to the plate 22 is a base 23 which extends outwardly from the plate 22 and carries ring 24. As best shown in FIG. 4, a series of rollers 25 are journaled on the outer surface of the ring 24 and the rollers are adapted to ride between the lower surface of turntable 27 and the lower horizontal flange 26. Extending upwardly from opposite sides of the turntable are arms 28, and the arms are pivotally connected by pins 29 to brackets 30 which extend rearwardly from the innermost conveyor section 9.

As the conveyor 8 is secured to turntable 27 which is rotatably mounted on the ring 24, the entire conveyor can pivot with the turntable in a horizontal plane. To provide this pivotal movement, a chain 31 is secured by welding to the outer surface of the turntable 27 and the chain is engaged by a drive sprocket 32 attached to the drive shaft 33 by a hydraulic motor 34 mounted on platform 35. Rotation of the drive shaft 33 drives the sprocket 32 which, in turn, drives chain 31 to pivot the turntable 27 and conveyor 8 in a generally horizontal plane.

To pivot the conveyor 8 in a vertical plane about the axis of pins 29, one end of a hydraulic cylinder 36 is connected to lugs 37 on L-shaped bracket 38. The upper end of the L-shaped bracket is connected to the turntable 27, while the lower end of the L-shaped bracket extends inwardly beneath base 23 and is provided with a projection 39 which is journaled within a bearing 40 formed in the lower surface of the base 23.

Extending outwardly from the cylinder 36 is a piston rod 41 which is pivotally connected to lugs 42 attached to cross bracket 43 carried by the inner conveyor section 9. By introducing hydraulic fluid into the lower end of cylinder 36, the piston rod 41 will be extended to thereby pivot the conveyor upwardly about the pins 29. By introducing the hydraulic fluid into the opposite or upper end of the cylinder 36, the piston rod 41 will be retracted, causing the conveyor 8 to pivot downwardly.

The conveyor 8 is also adapted to be pivoted about the axis of the shaft 21 in order to adjust or level the conveyor in the event the truck 1 may be resting on an incline or slope. In this regard, one end of a hydraulic cylinder 44 is connected to lugs 45 on the back side of plate 14, as best shown in FIG. 4. Extending from the cylinder 44 is a piston rod 46 and the outer end of the rod is connected to a pin 47 which extends within a generally curved slot 48 in plate 14. The outer end of the pin is connected to the base 23. As the piston rod 46 is extended, the base 23 and the conveyor 8 will pivot about the axis of the shaft 21 and the pin 47 will move downwardly within the curved slot 48. As the piston rod is retracted, the roller 47 will rise upwardly in a generally curved path within slot 48 to thereby pivot the base 23 and the conveyor 8 in the opposite direction.

The connection of the conveyor 8 to the truck chassis provides a great degree of versatility in that four distinct movements are provided. The hydraulic cylinder unit 16 enables the entire conveyor to be moved vertically, while the chain drive 31 permits the conveyor to rotate in a horizontal plane. The cylinder unit 36 pivots the conveyor in a vertical plane, while the cylinder unit 44 provides a leveling action and rotates the conveyor around the axis of shaft 21.

Figure 5:
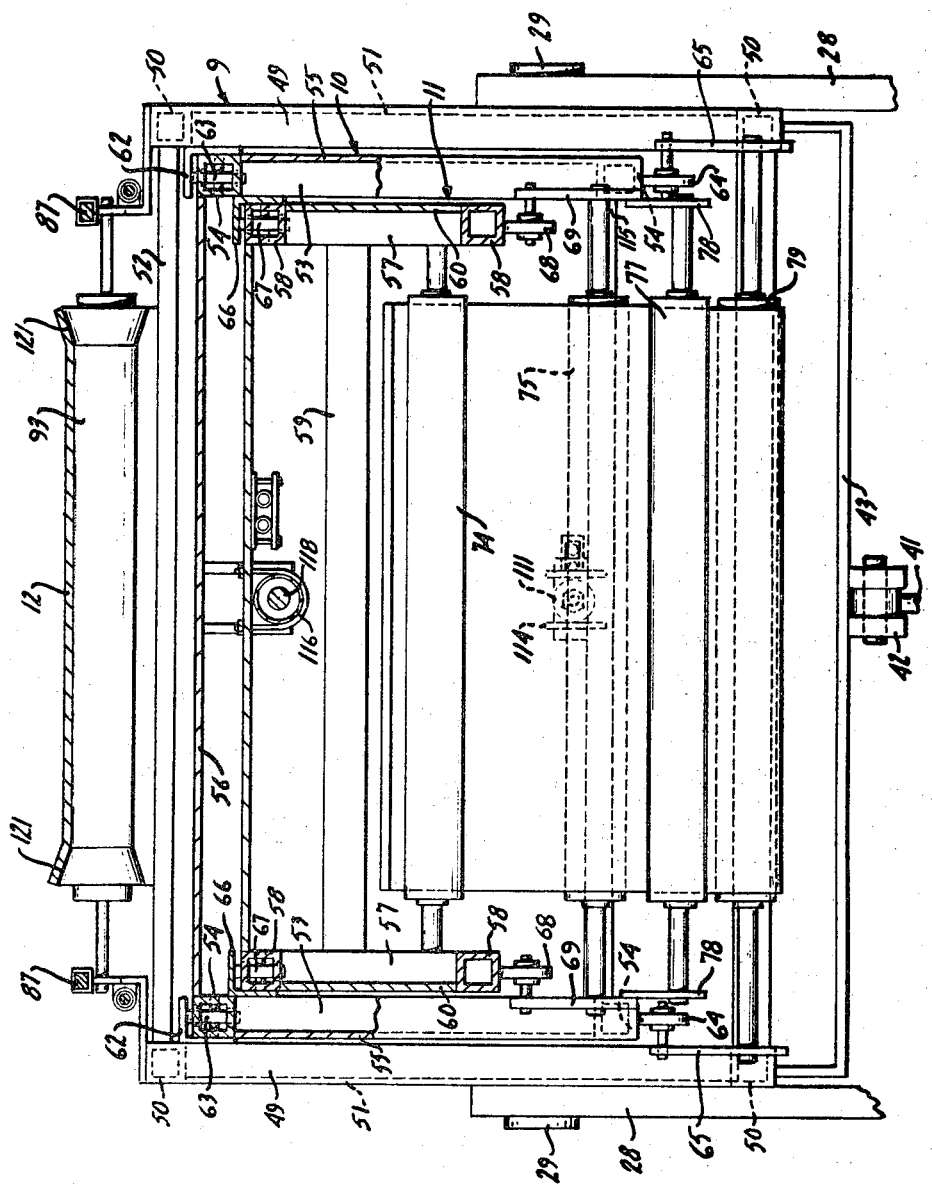
FIG. 5 is a transverse section taken along line 5—5 of FIGS. 2 and showing the nested telescopic conveyor sections.

As best illustrated in FIG. 5, the innermost conveyor section 9 is generally rectangular in cross section and consists of a series of vertical supports 49 connected by horizontal supports 50. Side walls 51 are connected to the supports 49 and 50, while a top wall 52 is secured to the upper horizontal supports 50.

The middle conveyor section 10 is constructed in a manner similar to that of the larger innermost conveyor section 9 except that the dimensions are smaller so that the middle section 10 can telescope within the inner section 9. The middle section 10, as shown in FIG. 5, includes a series of vertical supports 53 and a series of horizontal supports 54 which are connected together to provide the generally rectangular cross section. Side walls 55 enclose the sides of the section, while top wall 56 is connected to the upper horizontal supports and serves to close off the upper end of the middle section 10.

The outermost section 11 is also similar to sections 9 and 10 and is generally rectangular in cross section, but smaller, so that it will nest within the middle section 10. The outermost section comprises a series of vertical supports 57 which are connected at their ends by horizontal supports 58. In addition, a series of cross beams 59 extend between the vertical supports. Side walls 60 enclose the sides of the outermost section 11, while a top wall 61 is secured to the upper horizontal supports 58 and encloses the upper end of the outermost section.

To guide the middle section in telescopic movement with respect to the innermost section 9, angle-shaped tracks 62 are secured to the inner surfaces of the innermost section 9 adjacent the upper ends of the vertical supports 49.

Wheels 63 are journaled within the horizontal supports 54 of the middle section 10 and the wheels 63 extend through slots in the horizontal supports 54 and ride against the upper flange of the guide tracks 62. In addition to the wheels 63, a wheel 64 is journaled on the upper portion of each of a pair of brackets 65 secured to the outer end of the innermost section 9. Wheels 64 are adapted to ride on the lower surface of the lower horizontal supports 54 of the middle conveyor section 10. Thus, the middle section is guided for sliding movement within the inner section by the rollers 63 at the inner end of the middle section and by the rollers 64 connected to the outer end of the inner section 9.

The outer section 11 is guided for sliding movement with respect to the middle section 10 in a similar manner. Angle-shaped guide rails 66 are secured to the inner surfaces of the middle section 10 adjacent the upper ends of the vertical supports 53, and a pair of rollers 67 journaled within the horizontal supports 58 of outer section 11 are adapted to ride against the upper flanges of the guide tracks 66.

In addition, rollers 68 are journaled on brackets 69 which extend outwardly from the outer end of the middle section 10, and rollers 68 are adapted to ride on the lower surface of the horizontal supports 58 of the outer section as the outer section 11 extends and retracts with respect to middle section 10.

The belt 12 on which the concrete or other material is conveyed is adapted to telescope along with the telescopic movement of the conveyor sections. The belt 12 is carried at its inner end by a large convex, idler roller 70 which is mounted on an adjustable frame 71 connected to the inner end of the conveyor section 9, and the belt is driven by a large convex drive roller 72 mounted on an adjustable frame 73 connected to the outer end of the outer section 11. After leaving the drive roller 72 in its return path of travel toward the truck 1, the belt passes over a roller 74 which is journaled between the side walls 60 at the inner end of the outer section 11 and then reverses its travel and passes over a roller 75 journaled in brackets 69. After leaving the roller 75, the belt again doubles back and passes over roller 77 which is journaled between brackets 78 extending downwardly from the inner end of the middle conveyor section 10. After passing over the roller 77 the belt again doubles back and passes over the roller 79 which is journaled between the brackets 65, as best shown in FIG. 5. The belt 12 then passes over the roller 81 which is journaled between the side walls 51 of the inner section 9 and then travels to the convex idler roller 70 at the inner end of the conveyor.

After passing over the idler roller 70 the belt rides over the roller 82 journaled within brackets 83 extending upwardly from the inner conveyor section 9.

A belt supporting roller 84 is located outwardly of the roller 82 and is journaled within brackets 85 secured to the inner conveyor section 9, as best shown in FIG. 8. The upper end of each bracket 85 carries a tubular guide member 86 which is generally rectangular in cross section and has a flanged or fluted outer end. A guide rod 87 is mounted for sliding movement within the guide 86. Extending outwardly from the lower portion of the bracket 85 is a lug 88 and a tube 89 is secured within an opening in the lug 88.

A belt supporting roller 90 is journaled within brackets 91 which also extend upwardly from the inner conveyor section 9. As in the case of the support roller 84, a tubular guide member 92, similar to guide member 86, is secured to the upper end of the bracket 91 and serves to guide the rod 87 in sliding movement. The rollers 82, 84 and 90 are all fixed with respect to the inner section 9, and the belt, after leaving the roller 90, passes over a movable roller 93 which is journaled within a pair of brackets 94. The upper end of each bracket 94 carries a tubular guide 95 which slidably receives the rod 87 and the lower end of each bracket 94 is provided with a lug 96 and a tube 97 is secured within an opening in the lug 96. Tube 97 has a smaller diameter than tube 89 and is slidable within tube 89. As the tube 97 moves axially with respect to the fixed, larger diameter tube 89, it carries the belt support roller 93 with it.

Each guide rod 87 is also guided for sliding movement in a sleeve 98 which is supported by brackets 99 extending upwardly from the middle section 10.

A second movable roller 100 is journaled within brackets 101 and the upper end of each bracket carries a sleeve or guide 102 which slidably receives the rod 87. Lugs 103 extend outwardly from the lower end of each bracket 101 and a tube 102 is secured within an opening in the lug 103. The tube 104 has a smaller external diameter than the internal diameter of tube 97 and is adapted to telescope within the tube 97. As the tube 104 telescopes within the tube 97 the belt support roller 100 is correspondingly moved.

After the belt passes over roller 100, it engages roller 105 which is pournaled in bars 106 secured to vertical support brackets 107. Brackets 107 are mounted on the outer end of conveyor section 11 and serve as the support for the guide rods 87.

As best shown in FIG. 8, a small diameter tube 108 is mounted for telescopic sliding movement within each tube 104, and the outer end of each tube 108 is connected to a lug on the vertical bracket 106 so that the tube 108 is fixed with respect to the outer section 11.

The tubes 89, 97, 104 and 108 are provided with progressively smaller diameters and are adapted to telescope in accordance with telescopic movement of the conveyor sections. The inner ends of the tubes 97, 104 and 108 are provided with enlarged heads 109, as best shown in FIG 10, and as the respective tube is extended or moved outwardly, the enlarged head engages the lip 110 on the tube within which it is sliding. For example, as the tube 104 is moved outwardly, the head 109 on the tube 108 will engage the lip 110 on the outer end of the tube 104 and tube 104 will then be moved outwardly in accordance with movement of tube 108. Similarly, when the tube 104 is fully extended, the head 109 on tube 104 will engage the lip 110 on the tube 97 to thereby move the tube 97 outwardly. As the movable belt support rollers 93 and 100 are secured to tubes 97 and 104, respectively, telescopic movement of tubes 97 and 104 will correspondingly move rollers 93 and 100 to maintain approximate equidistant spacing between the belt supporting rollers at all positions of extension and retraction of the conveyor sections.

To extend the middle section 10 with respect to the inner section 9, the inner end of a hydraulic cylinder 111 is pivotally connected to a cross member 112 located at the inner section 9. Piston rod 113, which is mounted within the cylinder 111, extends within middle section 10 and is connected to a lug 114 secured to a cross member 115 in the central section 10. By introducing hydraulic fluid into the inner end of cylinder 111, the piston rod 113 will be extended to thereby move the middle section 10 outwardly with respect to the inner section 9. By introducing hydraulic fluid into the opposite end of cylinder 111 the piston rod 113 will be retracted to thereby telescope the middle section 10 inwardly with respect to the section 9.

The outer section 11 is moved with respect to the middle section in a similar manner. One end of a hydraulic cylinder 116 is pivotally connected to a cross member 117 located at the inner end of the middle section 10. The cylinder 116 extends within the interior of the outer section 11 and the piston rod 118 is pivotally connected to a lug 119 secured to a cross member 120 located at the outer portion of the outer member 11. With this connection, extending and retracting the piston rod 118 with respect to the dylincer 116 will correspondingly remove the outer section with respect to the central section 10.

In the retracted position as shown in FIG. 2, the belt 12 travels in a series of reverse bends moving over the rollers 74, 75, 77, 79 and 81 to thereby take up the slack and maintain the belt 12 in a taut condition when the conveyor sections are retracted. As the section 11 is extended with respect to the section 10, the rollers 74 and 75 will move together to thereby maintain the taut condition of the belt during telescopic movement of the conveyor sections. Similarly, as middle conveyor section 10 is extended with respect to section 9, roller 77 moves toward roller 79 to maintain the taut condition of the belt during this telescopic movement.

The portion of belt 12 moving outward along the top of the conveyor supports the concrete or other material being conveyed and in order to adequately support this portion of the belt, the rollers 93 and 100 move during telescopic movement of the conveyor sections so that there will be a generally equidistant spacing of the supporting rollers at all extended and retracted positions of the conveyor sections. As previously mentioned, the rollers 93 and 100 are movable along the guide rod 87 and the rollers are moved along the guide rod by the movement of the telescopic tubes 89, 97, 104 and 108. When the conveyor sections are in the telescoped or retracted position, the tubes 89, 97, 104 and 108 will correspondingly be telescoped. If, for example, the cylinder 116 is then operated to extend the outermost section 11, the tube 108 will move with the outer section and move out of telescopic relation with the tube 104. When the head 109 of the tube 108 engages the lip 110 on the tube 104, the tube 104 will then be moved outwardly along with the tube 108, and as the roller 100 is connected to the tube 104, the roller 100 will then be moved outwardly along the guide rod 87. When the tube 104 reaches its extended position, the head 109 of rod 104 will engage the lip 110 on tube 97 to thereby extend the tube 97. As the roller 93 is connected to the tube 97, the roller 93 will then also be moved outwardly along the guide rods 87. With this construction the rollers 93 and 100 are moved outwardly in accordance with extending movement of the conveyor sections to thereby provide relatively equal spacing between the support rollers for that portion of the belt which is conveying the concrete.

When the conveyor sections are retracted, the tubes 89, 97, 104 and 108 act in a similar manner to move the rollers 93 and 100. For example, as the outer section 11 moves inwardly the lug 108′ will engage the end of the rod 104 and further, inward movement of the outer section will cause the tube 104 to telescope within the tube 97. When the lug 103 of the telescopic tube 104 engages the end of the tube 97, the tube 97 will then be telescoped within the tube 89, and this action is continued until the four rods are in the completely telescoped or retracted position. As previously mentioned, when the tube 104 is retracted, the wheel 100 will move accordingly, and similarly, when the tube 97 is retracted, the roller 93 will also be moved inwardly. This construction automatically positions the movable supporting rollers 93 and 100 at substantially equidistant locations at all extended and retracted positions of the conveyor to thereby enable the concrete on the belt to be adequately supported at all times.

Support rollers 82, 84, 90, 93, 100 and 105 are provided with enlarged, frusto-conical ends 121 so that the flexible belt 12 will have a generally trough-like contour as it passes along the upper portion of the conveyor where it is conveying the concrete or other material. The enlarged ends 121 on the rollers can be conveniently provided by fitting a generally frusto-conical end piece over the ends of the cylindrical rollers.

The adjustable frame 73, which carries the belt drive roller 72, includes a pair of generally vertical side plates 122 and a pair of horizontal, angle-shaped guides 123 are attached to the upper ends of the respective plates 122, as shown in FIGS. 6 and 7. Similarly, a pair of angle-shaped guides 124 is attached to the lower ends of the plates 122. The guides 123 are adapted to ride against the lower surface of the horizontal arms 125 which extend outwardly from the brackets 106 at the end of the outer section 11, while the guides 124 are adapted to ride on horizontal arms 126, which are connected to the outer end of the outer section 11 through spacers 127. With this arrangement, the plates 122 can slide freely along the bars 125 and 126 toward and away from the end of the outer section 11.

To lock the plates 122 at any desired location and thereby maintain the proper tension on the belt 12, a series of studs 128 extend through openings in lugs 129 attached to the inner surface of section 11 and through aligned openings in lugs 130 attached to the inner surface of the plates 122. Locking nuts 131 are threaded onto the studs 128 and serve to lock the studs with respect to the lugs 129 and 130 and thereby prevent movement of plates 122 with respect to outer section 11.

As best shown in FIG. 7, roller 72 is mounted on a shaft 132 which is journaled within the plates 122. One end of shaft 132 is operably connected to the drive shaft of a hydraulic motor 133 which is mounted on a platform 134 attached to the outer surface of the plate 122.

The concrete or other material which is being conveyed on belt 12 is discharged from the belt as the belt passes around the drive roller 72. To clear any remaining concrete or other foreign material from the belt, a brush 135 is located beneath the roller 72 and rotates in contact with the belt. As shown in FIG. 7, brush 135 is mounted on a shaft 136 which is journaled within a pair of brackets 137. Brackets 137 are adjustably connected to the plates 122 by bolts 138 which extend through aligned horizontal slots 139 formed in plates 122 and vertical slots 140 in the brackets 137. By virtue of the horizontal slots 139 and vertical slots 140, the position of the brackets 137 can be varied with respect to the plates 122. This adjustment serves to compensate for wear of the brush.

To enable the shaft 136 to move relative to the plates 122 for brush adjustment, each of the plates 122 is provided with a hole 141, shown in FIG. 6, through which the shaft 136 extends. Thus, the bracket 137 and the attached shaft 136 can be freely moved relative to the supporting plates 122.

The outer end of the brush shaft 136 carries a pulley 142 which is driven by a belt 143 from a pulley 144 connected to the outer end of the roller shaft 132. With this connection, rotation of the drive shaft of the hydraulic motor 133 acts to not only rotate the drive roller 72, but also acts through the belt drive 143 to rotate the brush 135. The brush is normally rotated at a slower speed than the roller 72.

To aid in directing the discharge of the concrete from the conveyor belt 12, a hood 145, shown in FIG. 6, is attached to the outer end of the adjustable frame 73. Extensions 146 project outwardly from the plates 122 and the side edges of the hood 145 are connected by bolts to the extensions 146. In addition to the hood 145, a deflector plate 147 is located above the roller 72 and aids in directing the concrete into the hood 145. Deflector plate 147 is mounted on a bar 148 which extends transversely of the conveyor and is supported by a pair of brackets 149 from the arms 125. As a further aid in directing the discharge of the concrete or other conveyed material, a deflector plate 150 is mounted across the lower ends of the plates 122 and extends downwardly and forwardly beneath the brush 135.

As previously discussed, the various pivotal adjustments for the conveyor, as well as the telescoping movement of the conveyor, and the movement of the conveyor belt 12 are all achieved through a hydraulic system. A tank 151, which serves as a reservoir for the hydraulic fluid, is located on the truck chassis 3 behind the cab 2 and the hydraulic fluid being pumped from the tank 151 is directed by a series of manually operated valves in bank 152 to the various cylinders and motors utilizing the fluid.

The hydraulic motor 133, which drives the conveyor belt 12, is located at the outer end of the conveyor and when the conveyor is in the extended position, the motor is a substantial distance, up to 25 feet or more, from the truck. If normal hydraulic hoses were employed to supply the hydraulic fluid to the motor 133, the hoses would have to be folded or wound in some manner when the conveyor sections were in the retracted position to prevent the hoses from dragging on the ground. To avoid this problem, the present invention utilizes telescopic hydraulic lines to supply fluid to the hydraulic motor 133 and return fluid to the reservoir. As best shown in FIG. 3, flexible lines 153 or hoses are connected between the valve bank 152 and tubes 154 which are clamped to the undersurface of the inner conveyor section 9 by a clamp 155. Tubes 154 are adapted to telescopically receive smaller diameter tubes 156 which are sealed to the tubes 154 through a seal assembly 157 mounted on the end of conveyor section 9. Similarly, tubes 158 are adapted to telescope within the tubes 156 and are sealed to the tubes 156 through a seal assembly 159 mounted on middle conveyor section 10. The outer ends of the smaller diameter tubes 158 are connected by hoses 160 to the hydraulic motor 133.

The seal assemblies 157 and 159 are identical in structure and FIG. 11 illustrates the seal assembly 157. As shown in this drawing, the tube 154 is secured within an opening in the casing 161 of seal assembly 157 and the smaller diameter tube 156 is slidable within the tube 154. A pair of O-ring assemblies 162 and 163 are mounted within annular recesses formed in the inner surface of the casing 161 and provide a seal against the outer surface of tube 156.

In addition to the seal provided by the O-ring 162 and 163 assemblies, a flexible resilient wiper member 164 is located in a recess at the outer end of the casing 161 and is adapted to ride against the surface of the tube 156 as it moves relative to the tube 154. The wiper 164 is retained in position by a pair of flexible rings 165 and 166. In addition, a wire spring 167 is secured within a recess in the wiper member 163 and urges the wiper inwardly toward the tube 156. The wiper member 164 functions to remove or wipe away any concrete or other foreign material from the outer surface of the tube 156 as tube 156 is telescoped within tube 154, and thereby prevents the foreign material from contacting the O-ring seals or entering the hydraulic system.

Telescopic hydraulic lines, similar to that employed to supply fluid to the belt motor 133, can also be used to supply fluid to the cylinder 116 if desired.

As previously mentioned, the idler roller 70, which supports the belt 12 at the inner end of the conveyor, is mounted on an adjustable frame 71. The roller shaft 168 of roller 70 is journaled within a bearing support plate 169 which is adjustably supported on the frame 71 by means of threaded studs 170 which function in a manner similar to studs 128 on frame 73. In addition, a pair of tubular guides 171 is mounted on the upper end of the frame 71 in alignment with the rods 87 and serve to receive and support the guide rods 87 when the conveyor sections are in the retracted position.

During transporting, the conveyor 8 is in the retracted position and is pivoted upwardly, as shown by the phantom lines in FIG. 1. When the truck reaches the site of pouring, the conveyor is extended to the desired length and adjusted, both horizontally and vertically, to position the hood 145 at the location where the concrete is to be discharged. In this regard, the entire conveyor 8 can be elevated vertically by actuating the hydraulic cylinder 16 to position the inner end of the conveyor beneath the chute 7. In addition, the conveyor can be pivoted or rotated in a horizontal plane by operating chain drive 31 and can also be pivoted in a vertical plane through actuation of cylinder unit 36 to achieve the desired incline of the conveyor. If the truck is resting on uneven terrain, the cylinder unit 44 can be operated to pivot the unit about the axis of shaft 21 and enable the conveyor to maintain a horizontal attitude.

With the conveyor properly positioned, the conveyor belt 12 is operated by supplying hydraulic fluid to the motor 133 and as the concrete is supplied to the inner end of the conveyor, it is conveyed along the belt and discharged through the hood 145 to the site of pouring. As previously mentioned, extending the conveyor sections moves the movable belt-supporting rollers 93 and 100 so that the portion of the belt carrying the concrete will be supported by rollers at spaced intervals throughout its length.

After the concrete being carried by belt 12 is discharged through the hood 145, the belt will ride against the rotating brush 135 to clear the concrete from the belt surface.

The conveyor can be extended and contracted while the unit is conveying material and it is not necessary to stop the operation of the belt while extending or retracting the conveyor sections. This enables concrete to be poured throughout a large area without moving the truck as the concrete is poured. The operator who is normally standing at the rear of the truck at the valve bank 152 can visually determine where the concrete is to be poured and move or adjust the conveyor while the concrete is moving on belt 12 so that the concrete is progressively distributed through the entire pouring area.

The telescopic movement of the conveyor sections enables the material to be conveyed to a distance of about 25 feet or more from the truck. The horizontal adjustment permits the conveyor to swing horizontally through an arc of about 180°, while the vertical adjustment enables the conveyor to convey material up to an angle of about 40° with respect to the horizontal and downwardly at an angle of about 45°. By tilting the conveyor about the axis of shaft 21, the conveyor can be leveled, regardless of the position or attitude of the truck.

While the drawings illustrate the conveyor attached to a conventional ready-mixed concrete truck, it is contemplated that the conveyor can be attached to a fixed support, or the conveyor can be mounted on a self-propelled vehicle. In addition to conveying concrete, the conveyor can be used to convey any type of bulk material.

The frustoconical ends 121 on belt support rollers 82, 84, 90, 93, 100 and 105 provide a geenrally trough-like contour for that portion of the belt conveying the concrete or other material. This method of providing the trough-like roller contour is relatively inexpensive for it requires only two bearings for the roller, while conventional roller constructions employed a series of rollers on each shaft to achieve the trough-like contour and this requires additional sets of bearings.

As an additional feature, the cylindrical portion of each of the belt support rollers is made of relatively soft, resilient rubber or plastic, while the frustoconical ends 121 are made of a smooth, harder material which can be hard rubber, plastic or metal. As the belt travels over the support rollers 82, 84, 90, 93, 100 and 105, the belt rotates the rollers and the tendency is for the belt to drive or rotate the support rollers through the frustoconical ends 121. By making the ends 121 of a smoother material having less frictional resistance than the central portion of the roller, the belt will drive the roller more uniformly throughout the length of the roller, thereby distributing the wear more evenly.

The convex contour of drive roller 72 and idler roller 70 serves to train the belt to the center of the rollers to thereby maintain alignment of the belt on the rollers.

Various modes of carrying out the invention are contemplated as being within the scope of the following claims particularly pointing out and distinctly claiming the subject matter which is regarded as the invention.

I claim:
1. A conveying apparatus, comprising a supporting structure, a conveyor mounted on the supporting structure and including a first conveyor section and a second conveyor section with said second conveyor section being mounted for telescopic movement with respect to said first conveyor section, first drive means for moving the conveyor sections in telescopic movement, a conveying member mounted for endless movement on said first and second conveyor sections, second drive means operably connected to said endless member for moving said conveying member in an endless path, a first support member fixed to said first conveyor section and disposed to support the conveying member, a second support member fixed to said second conveyor section and disposed to support the endless conveying member, a movable support member located between said first and second support members and disposed to support the endless conveying member and mounted for relative movement with respect to both the first and second conveyor sections, means for moving the movable support member outwardly away from the first conveyor section when the second conveyor section is extended a predetermined distance with respect to the first conveyor section, and means for moving the movable support member inwardly toward the first conveyor section when the second conveyor section is retracted a predetermined distance from its fully extended position.

2. The apparatus of claim 1, in which the supporting structure is a self-propelled vehicle.

3. The apparatus of claim 1 wherein said means for moving the movable support member outwardly comprises abutment means connected to said second conveyor section and disposed to engage the movable support member after said second conveyor section has been extended a predetermined distance.

4. The apparatus of claim 1 wherein one of said conveyor sections is telescopic within the other and the conveying portion of said endless member travels in a generally straight path from the inner end of said first conveyor section to the outer end of said second conveyor section.

5. The apparatus of claim 1, and including a first actuating member connected to said first conveyor section, and extending longitudinally of said first conveyor section, a second actuating member disposed in telescopic relation with said first actuating member and connected to said second conveyor section, said movable support member being mounted on said second actuating member whereby said movable support member is moved with respect to said first conveyor section on telescopic movement of said second actuating member with respect to said first actuating member.

6. The apparatus of claim 5, and including means responsive to a predetermined amount of telescopic movement of said second conveyor section with respect to said first conveyor section for telescoping said second actuating member with respect to said first actuating member to thereby move said movable support member.

7. In a material handling device, a supporting structure, a conveyor carried by the supporting structure and including an endless conveyor member mounted for endless travel on said conveyor and including a series of rotatable support members disposed to support the portion of the endless member conveying the material, each of said rotatable support members including a shaft and having a generally cylindrical central section disposed concentrically of said shaft and each support member having frustoconical end sections fixed to said central sections and having diverging outwardly in an axial direction from the central section, the central portion of said endless conveying member being supported in travel on said central section and the peripheral edge portions of said endless member being supported in travel on said end sections to provide the endless member with a trough-like contour, said central section being formed of a material having a substantially greater coefficient of frictional resistance than the material of said end sections, whereby the peripheral edge portions of the endless member tend to slip on said end sections to compensate for the greater speed of the peripheral edge portions and thereby distribute the wear more evenly throughout the width of the endless member.

8. The apparatus of claim 7, in which the central section is formed of a relatively soft resilient rubber-like material and said end sections are formed of a harder smooth material.

9. In a conveying apparatus, a supporting structure, an extensible conveyor having a plurality of telescopic conveyor sections and having an endless conveying member mounted for endless movement on said conveyor sections, a base, means for pivotally connecting said base to the supporting structure about a first horizontal axis, a turntable mounted for rotation on the base, the innermost conveyor section being pivotally connected to the turntable about a second horizontal axis disposed normal to said first horizontal axis, first drive means for rotating said turntable on said base to move said conveyor in a generally horizontal plane, second drive means interconnecting the supporting structure and the base at a location offset from said first horizontal axis for pivoting said conveyor about said first horizontal axis, and third drive means interconnecting the turntable and the conveyor for pivoting said conveyor in a generally vertical plane about said second horizontal axis.

10. The conveying apparatus of claim 9 in which the first drive means comprises a chain attached to the turntable, a sprocket engaged with the chain, and a hydraulic motor operably connected to the sprocket.

11. The apparatus of claim 9, and including vertical guide means disposed on said supporting structure, means for mounting said base for vertical movement on said guide means, and fourth drive means for moving said base on said guide means.

12. A material handling apparatus, comprising a supporting structure, an extensible conveyor including a plurality of telescopic conveyor sections with said sections arranged to telescope one within the other, the innermost of said conveyor sections being connected to said supporting structure, an endless conveying member mounted for endless movement on said conveyor sections, said conveying member being arranged so that the conveying portion of the endless conveying member travels in a path from the inner end of the innermost conveyor section to the outer end of the outermost conveyor section, a hydraulic motor operably connected to the conveying member and disposed at the outer portion of the outermost conveyor section for driving the conveyor member in an endless path on said conveyor sections, a reservoir to contain a hydraulic fluid and mounted on said supporting structure, and conduit means connecting the reservoir to the hydraulic motor, said conduit means being disposed within said conveyor sections and at least a portion of said conduit means comprising telescopic fluid-conducting lines.

13. The apparatus of claim 12, in which the conveying member is an endless belt and said apparatus includes a series of belt-supporting rollers with the rollers which support the portion of the belt moving in a direction from the inner end to the outer end of the conveyor having enlarged ends to provide said portions of the belt with a generally trough-like shape in cross section.

14. The apparatus of claim 12, in which the telescopic fluid-conducting lines include a first tube fixed to the innermost conveyor section and a second tube slidable with respect to the first tube and connected to said second conveyor section, and means for telescoping the second tube with respect to the first tube in accordance with telescopic movement of said second conveyor section with respect to said first conveyor section.

15. A conveying apparatus, comprising a supporting structure, a conveyor mounted on the supporting structure and including a first conveyor section and a second conveyor section with said second conveyor section being mounted for telescopic movement with respect to said first conveyor section, first drive means for moving the conveyor sections in telescopic movement, a conveying member mounted for endless movement on said first and second conveyor sections, second drive means operably connected to said endless member for moving said conveying member in an endless path, a first support member fixed to said first conveyor section and disposed to support the conveying member, a second support member fixed to said second conveyor section and disposed to support the endless conveying member, a movable support member located between said first and second support members and disposed to support the endless conveying member and mounted for relative movement with respect to both the first and second conveyor sections, and means responsive to extended telescopic movement of said second conveyor section with respect to said first conveyor section for moving said movable support member relative to both said first and second support members to dispose said movable support member substantially equidistant between said first and second support member when said second conveyor section is fully extended with respect to said first conveyor section.

References Cited

UNITED STATES PATENTS

| | | | |
|---|---|---|---|
| 1,231,495 | 6/1917 | Martin | 198—139 |
| 2,458,031 | 1/1949 | Rome | 214—83.66 |
| 2,522,128 | 9/1950 | Lehmann | 214—701 |
| 2,609,115 | 9/1952 | Oklejas | 214—83.26 |
| 3,003,611 | 10/1961 | Pelzer | 198—319 |
| 3,126,653 | 3/1964 | Bourgeous | 198—7 |
| 3,139,975 | 7/1964 | Schaefer | 198—230 |
| 3,151,732 | 10/1964 | Oury | 198—92 |
| 3,207,044 | 9/1965 | Hall | 91—414 |
| 2,592,581 | 4/1952 | Lorig | 198—202 |
| 3,221,868 | 12/1965 | Ricker | 198—192 |
| 373,389 | 11/1887 | Creager | 198—192 |
| 490,850 | 1/1893 | Johnston | 198—192 |
| 766,013 | 7/1904 | Baldwin | 198—230 |
| 2,042,388 | 5/1936 | Cogito | 259—169 |
| 2,925,168 | 2/1960 | Lorig | 198—202 |
| 3,185,290 | 5/1965 | Dietrich | 198—233 |

FOREIGN PATENTS

| | | |
|---|---|---|
| 946,204 | 1/1964 | Great Britain. |
| 798,251 | 7/1958 | Great Britain. |
| 340,620 | 9/1921 | Germany. |

RICHARD E. AEGERTER, *Primary Examiner.*